United States Patent [19]
Allington

[11] 3,859,539
[45] Jan. 7, 1975

[54] OPTICAL SYSTEM
[75] Inventor: Robert William Allington, Lincoln, Nebr.
[73] Assignee: Instrumentation Specialties Company, Lincoln, Nebr.
[22] Filed: Apr. 25, 1973
[21] Appl. No.: 354,175

[52] U.S. Cl. .............................. 250/575, 250/205
[51] Int. Cl. ........................................... G01n 21/26
[58] Field of Search ...... 250/218, 205, 216; 356/88, 356/93, 94, 95, 204, 207, 208, 178

[56] References Cited
UNITED STATES PATENTS

| | | | |
|---|---|---|---|
| 3,279,308 | 10/1966 | Bartz | 356/95 |
| 3,457,407 | 7/1969 | Goldberg | 250/218 |
| 3,463,927 | 8/1969 | Allington | 250/218 |
| 3,504,978 | 4/1970 | Shibata | 250/218 |
| 3,532,434 | 10/1970 | Jones | 356/178 |
| 3,562,795 | 2/1971 | Frenk | 250/218 |
| 3,724,951 | 4/1973 | Seelbinder | 356/208 |

Primary Examiner—James W. Lawrence
Assistant Examiner—D. C. Nelms
Attorney, Agent, or Firm—Vincent L. Carney

[57] ABSTRACT

To maintain the intensity of a beam of light applied to an absorbance cell constant in an optical system for measuring the light absorbance of a fluid within the absorbance cell, a primary light source, which is positioned in one focus of a prolate-spheroid-shaped reflector, radiates light to a photosensitive element of a light-intensity monitor and to a light-radiating member, which is positioned in the other focus of the prolate spheroid, with the light-radiating member reradiating the light with proportional intensities to two or more light absorbance cells. The photosensitive element generates a signal representing changes in the intensity of light from the primary light source and applies this signal through a feedback to a light-intensity control circuit which changes the intensity of light emitted by the primary light source in a direction that compensates for any changes in the intensity in the light emitted from the light-radiating member.

23 Claims, 4 Drawing Figures

Patented Jan. 7, 1975

3,859,539

OPTICAL SYSTEM

This invention relates to apparatus for controlling the intensity of beams of light in an optical system.

In one class of optical system, a primary light source located in one focus of an ellipsoidal reflector radiates light to a light-radiating member in the other focus, which light-radiating member re-radiates the light through light absorbance cells. Variations in the intensity of light are detected by a photosensitive element which applies signals through a negative feedback circuit to change the intensity of light emitted by the primary light source in a direction that corrects for the variations.

In a prior art type of optical system of this class, the ellipsoidal reflector is a tubular ellipsoid and the radiating member is a cylinder aligned with one of the focal axis of the tubular ellipsoid. In this type of optical system, the photosensitive element is positioned near the primary light source to detect variations in the intensity of the light emitted by the primary light source.

The prior art optical systems of this type have a disadvantage of not precisely maintaining the intensity of the light that is transmitted constant because they fail to correct intensity of light under some circumstances when a correction is required or make a false correction under other circumstances. This imprecision occurs because the intensity of the light emitted from one location or in one direction within the primary light source varies with respect to the intensity of light emitted from another location or in another direction within the primary light source causing the light applied to the tubular reflector for application to the radiating member to vary with respect to the light received by the photosensitive element so that the feedback circuit fails to correct for changes or makes a false correction.

Another type of optical system of this class has been built and tested and shown to maintain the intensity of light constant with greater precision than the first type. In this type of optical system, the reflector is a prolate spheroid rather than a tubular ellipsoid and the radiating member is a flat, thin radiating member which radiates light into different paths which paths are transverse to its thin dimension.

It was believed that the intensity of light emitted by this prior art type optical system could be maintained constant to a great extent by having the photosensitive element detect the light emitted from a spot on the radiating member so that the feedback loop would correct for any changes in the intensity of light radiated from the radiating member rather than only monitoring the primary light source.

It has been discovered that this proposed type of optical system has some unexpected disadvantages. Primarily, the system is less stable than expected. Because of this, a more expensive feedback system is required and certain oscillations are detectable in the intensity of the light. Moreover, this system requires that a hole be drilled in the prolate spheroid to enable the photocell to monitor light on the radiating member and requires a relatively expensive mounting for the photocell.

It is not known exactly what causes the instability but it is believed that it is insufficient light intensity which prevents the rate of change of light from being as effectively detected by the photosensitive element as would be the case if the photosensitive element were detecting the greater light intensity from the primary light source.

Accordingly, it is an object of the invention to provide a novel optical system.

It is a further object of the invention to provide a novel apparatus for controlling the intensity of light in one or more beams of light.

It is a still further object of the invention to provide apparatus for controlling the intensity of light re-radiated from a primary light source.

It is a still further object of the invention to provide apparatus for monitoring the intensity of light in an optical system, which apparatus provides high stability and low noise.

In accordance with the above and further objects of the invention, an optical system includes a primary light source, a radiating member, a light intensity monitoring system, a prolate spheroid reflector, and a system utilizing the light radiated from the radiating member to provide beams of light for use in instruments.

The primary light source has its bright spot in one focus of the prolate spheroid and the radiating member has a radiating surface in the other focus of the prolate spheroid so that the radiating member receives light reflected by the prolate spheroid from the primary source of light and radiates it in a plurality of directions, with the light intensity in each direction being in a constant proportion to the light intensity in other directions. The light monitoring system includes a photodetector that receives light emitted from the primary light source and provides a signal through a feedback path to control the intensity of light emitted from the primary light source so that the light radiated by the light-radiating member is maintained at a constant intensity.

It has been found that there is a surprising improvement in the signal to noise ratio of the optical system when a prolate spheroid reflector is used instead of a tubular ellipsoid reflector with the same type of light intensity monitor. This improvement in the signal to noise ratio was greater than would be expected from tests run previously with a tubular ellipsoid and a monitor in which a photocell receives light directly from the primary light source and provides a signal through a feedback path to control the primary light source. In one series of tests, a 30 percent improvement in the signal to noise ratio was achieved through the use of the feedback monitor with the prolate spheroid construction while only a 10 percent improvement was achieved in using a similar light monitor with a tubular ellipsoid reflector. The use of the prolate spheroid reflector with a thin, flat radiator resulted in a further two to one improvement in the signal to noise ratio over the cylindrical radiator and tubular ellipsoid reflector, independently of the light intensity monitor.

The reason for the greater improvement in the signal to noise ratio of the combination of a prolate spheroid reflector with a light monitor that monitors the light directly from the primary light source over a tubular ellipsoid with a similar light monitor is not fully understood. However, it is believed that a photodetector monitoring a primary light source directly is better able to correct for fluctuations in light reflected by a prolate spheroid than tubular ellipsoid because a larger portion of the light emitted from the primary light source contributes to the final beams of light radiated from the radiating member when a prolate spheroid is used than when a tubular ellipsoid is used. Because of this, differences in the intensity of light emitted in different directions from the primary light source cause a smaller discrepancy between the light that contributes to the beams of light emitted from the radiating member and the light that controls the signal from the photodetector when a prolate spheroid is the reflector than when a tubular ellipsoid is the reflector.

As can be understood from the above description, the light source of the invention has a better signal to noise ratio than prior art arrangements, which better signal to noise ratio is achieved partly through a reduction in random noise and increased stability of the feedback loop controlling the light intensity of the primary light source, Moreover, the light source of the invention is less expensive to fabricate because it requires one less aperture than some proposed arrangements and is able to easily accommodate the photodetector by slipping it over the base of the primary light source rather than mounting it just outside of the reflector.

The above and further features of the invention will be better understood from the following detailed description when considered with reference to the accompanying drawings, in which.

GENERAL DESCRIPTION

Figure 1:
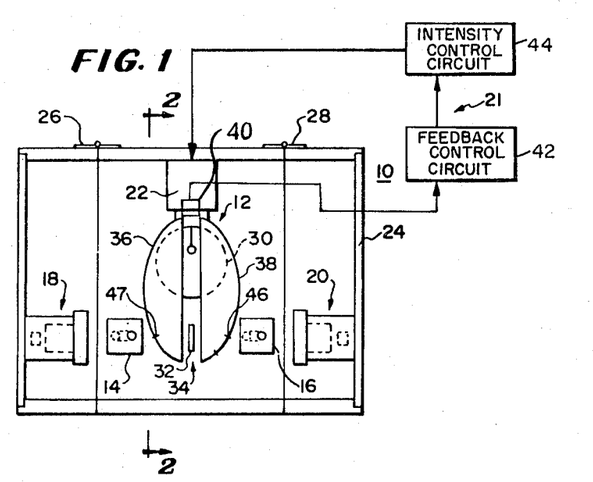
FIG. 1 is a view, partly in plan and partly schematic, of an optical system in accordance with an embodiment of the invention.

In FIG. 1, there is shown a dual-beam optical system 10 having as its principal parts a dual-beam light source 12, first and second light absorbance cells 14 and 16, first and and second light measuring cells 18 and 20, and a light-intensity monitor 21, which light-intensity monitor includes a photodetector 40.

The dual-beam light source 12 is mounted by a base 22 in a cenral location within a parallelepiped-shaped cabinet 24 and provides two oppositely directed beams of light, with the first light absorbance cell 14 being mounted between a first side of the dual-beam light source 12 and the first light measuring cell 18 and with the second light absorbance cell 16 being mounted between the second side of the dual-beam light source 12 and the second light measuring cell 20. The first side of the dual-beam light source 12, the first light absorbance cell 14 and the first light measuring cell 18 are aligned in a first beam of light, with the first light measuring cell 18 being mounted to a first side of the cabinet 24; the second side of the dual-beam light source 12, the second light absorbance cell 16, and the second light measuring cell 20 are aligned in a second beam of light, with the second light measuring cell 20 being mounted to a second side of cabinet 24. To provide access to the interior of the cabinet 24, its sides are hinged at 26 and 28, permitting it to be easily opened for assembly, repair and the replacement of parts when needed.

The dual-beam optical system 10 is a part of photometry apparatus of the type requiring two matched beams of light. One such type of photometry apparatus, for example, locates organic solutes such as different protein and amino acids and the like as they leave a chromatographic column during fractionating of the column.

In this type of apparatus, the different organic solutes are located as they leave the column by their different light absorbances, which are determined by transmitting a first beam of light from a dual-beam source of light through the solute-containing solvent as it leaves the column and a second beam of light from the dual-beam light source through a sample of the pure solvent going into the column and comparing the intensities of the light in the two beams before and after the solvent has passed through the column. However, it is understood that there are other specific uses for the dual-beam optical system 10 known to persons skilled in the art.

Even in dual-beam optical systems it is desirable to hold the light source intensity constant in order to improve the signal to noise ratio. This is because it is often difficult to perfectly match the two channels of the dual beam system.

While a dual-beam optical system 10 is shown in FIG. 1 and described above, single beam optical systems are used for similar purposes. For example, to locate organic solutes in a chromatographic column during fractionating of the column, a single beam light source transmits its single beam of light through the effluent as it leaves the column containing the solute and the solvent. Differences in the light absorbance within this effluent stream indicate the presence of different solutes at different locations. Moreover, a dual-beam light source may be operated as two single beam light sources, utilizing either the same wave length of light in each beam or different wave lengths of light in each beam to locate organic solutes leaving two different columns. Further, light sources may be designed to provide more than two light beams using principles analogous to dual-beam optical system 10 and these systems may all be used either to compare the light absorbance of fluids from two columns or to measure effluents from individual columns without such a comparison or a combination of the two functions.

To maintain the intensity of the two beams of light constant, the photodetector 40 of the light-intensity monitor 21 is positioned to sense changes in the intensity of the light applied to the dual beam light source 12 and is connected to control the intensity of this light as will be described more completely hereinafter.

Before operating the dual-beam optical system 10, the light-intensity monitor 21 is adjusted to establish the intensity of the light to be emitted from the dual-beam light source 12.

In the operation of the dual-beam optical system 10 to compare the light absorbance of fluids in two light absorbance cells, the first beam of light from the dual-beam light source 12 impinges on the first light measuring cell 18 after passing through the first light absorbance cell 14 containing a solute to be located in a chromatographic column flow stream or to have its concentration determined and the second beam of light from the dual-beam light source 12 impinges on the second light measuring cell 20 after passing through the second light absorbance cell 16 containing only the solvent. The first and second light measuring cells generate first and second electrical signals respectively in response to the light that impinges upon them and these signals are compared to provide a comparison between the light absorbance characteristics of the substances in the first and second light absorbance cells.

When operating as a single beam optical system or as two single beam optical systems, each beam of light impinges on a different measuring cell after passing through a light absorbance cell containing a solute to be located in a chromatographic column flow stream. Each of the light measuring cells generates an electrical signal in response to the light that impinges upon it and variations in this signal indicate the location of the solute leaving the chromatographic column corresponding to the light measuring cell.

Regardless of whether the dual beam light source 12 is operating as a single beam optical system or a dual beam optical system, if the intensity of the light emitted by the primary light source 12 varies from the preset intensity, the light-intensity monitor 21 senses the change and brings the intensity of the light emitted by the primary light source back to the preset intensity.

DETAILED DESCRIPTION OF STRUCTURE

The dual-beam light source 12 includes a lamp 30, a light radiating member 32, and a two-sector ellipsoidal reflector 34, with the two-sector ellipsoidal reflector 34 having a first sector 36 and a second sector 38.

To provide light for the first and second beams of light, the lamp 30 is mounted to the base 22 which serves as a socket for electrical connection and is centrally located within the dual-beam light source 12. The lamp 30 serves as a primary light source and may be any of several different types, the particular type generally being selected for its ability to provide light of the desired frequency.

In the preferred embodiment, the lamp 30 is a low pressure mercury vapor lamp that emits ultraviolet light having wavelengths which are particularly useful in some photometric apparatuses such as those that measure or compare the optical density or light absorbance of certain solutions containing organic materials such as protein, amino acid or the like. However, other types of lamps may be used as a primary light source for other purposes. This invention has particular utility in photometric apparatuses in which the light emitted from some locations in the primary light source fluctuates in intensity with respect to light emitted from other locations or in which light emitted in some directions fluctuates in intensity with respect to light emitted in other directions.

When the lamp 30 is a mercury vapor lamp as it is in the preferred embodiment, a thermal clamp is provided for the lamp. The thermal clamp may be a heat sink, which can be conveniently provided by forming the base 22 of metal.

If a thermal clamp is not provided for some types of mercury vapor lamps in the dual beam light source 12, the light intensity monitor 21 is unstable and the current through the lamp 30 increases to a large value. The current increases because of a self-repeating chain of four events, which are: (1) current through the lamp heats the vapor in the lamp, causing the temperature and vapor pressure to increase; (2) the increase in vapor pressure causes more of the light to be absorbed by the vapor, thus decreasing the intensity of light received by the photodetector 40; (3) the reduction in light intensity sensed by the photodetector causes the light intensity monitor 21 to increase the flow of current through the lamp to bring the intensity back to the set value; and (4) the increased flow of current further increases the temperature of the vapor within the mercury vapor lamp so as to start the chain of four events again.

Figure 2:
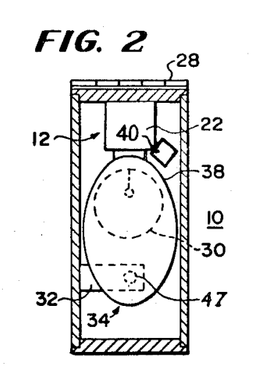
FIG. 2 is a side, sectional view of the optical system of FIG. 1, taken substantially along line 2—2 in the direction of the arrows.

To focus a large portion of the light from the lamp 30 onto the radiating member 32, the ellipsoidal reflector 34 has the general shape of a prolate spheroid, with each of the two sectors 36 and 38 being one sector of the spheroid spaced from the other sector at the center of the reflector 34 and having its concave side facing the concave side of the other. As best shown in FIG. 2, the bright spot of the lamp 30 is located in a first focus of the ellipsoidal reflector 34 to focus light on the second focus and the light radiating member 32 is located in the second focus to receive light from a large solid angle about the lamp 30.

The photodetector 40 is mounted to the base 22 of the lamp 30 so as to receive light directly from the lamp. With this arrangement, a change in the intensity of light emitted by the lamp 30 causes a relatively large change in the amount of light flux received by the photodetector compared to the change in the intensity of light in the light beams. This improves the stability of the light monitor and simplifies the feedback circuitry included in it.

To permit the first and second beams of light to leave the ellipsoidal reflector 34 along a single optical axis, two light-beam holes 46 and 47 are provided in the ellipsoidal reflector 34, with one of the light-beam holes 46 in one of the sectors being aligned with one of the light-beam holes 47 in the other sector and with the second focus. Because these two light-beam holes are aligned with the second focus of the ellipsoidal reflector 34 and with each other, light is not directly reflected in a straight line from one sector through the light intensity balancer 32 and the hole in the other sector into a light absorbance cell without being adequately diffused since there is no such light path, all straight paths of light from one reflector through the hole of the other reflector being at an angle with the first and second beams of light.

The light absorbance cells 14 and 16 have passageways aligned with the light-beam holes 46 and 47 and these passageways aid in collimating the light passing through the light-beam holes to the light measuring cells 18 and 20.

While ellipsoidal reflectors containing holes are well suited for focusing light on the light-reflecting member 32 and permitting discrete beams of light to be transmitted from a spot on the light-reflecting member 32 to light absorbance cells other types of reflectors are available, which other types can be used for the same purpose when properly constructed. Moreover, some types of lens systems or combinations of lens and reflectors can be used for the same purposes as the ellipsoidal reflectors.

To cause the light beams applied to the light absorbance cells to have intensities that are in a constant ratio to each other even when the intensity of the light emitted by lamp 30 from one location or in one direction from the lamp changes with respect to the intensity from another location or in another direction, the light radiating member 32 includes a transparent or translucent base with a flat light radiating portion mounted in one of the foci of the ellipsoidal reflector 34, the bright spot of the lamp 30 being mounted in the other foci. The flat light radiating portion is aligned with the light-beam holes in the sections 36 and 38 of the ellipsoidal reflector 34 in such a manner that a straight line through two of the light-beam holes 46 and 47 is perpendicular to the flat light radiating portion.

To cause the intensity of the light beams to be always in the same proportion, the light radiating portion of the light radiating member 32 may include, in general, any surface or combination of surfaces that radiates light proportionately in a plurality of different directions so that beams of light having light intensities proportional to each other in such directions may be formed from the light. In the preferred embodiment of the invention, two beams of light are radiated in different directions through the light-beam holes 46 and 47, and in this embodiment, no lens is necessary to focus the light into beams from the light radiating member since the beams are permitted to pass through the light-beam holes in different directions, thus removing the possibility of noise in the light caused by a poorly focused lens that applies light from too large an area of the radiating member 32 into the beams.

Because light is directed in two opposite directions from the light radiating member to the light absorbance cells, the light radiating member has its smallest dimension parallel to two of the light beams and this dimension is sufficiently small to avoid any significant attenuation of the light passing through the light radiating member. Generally, it is less than 1 millimeter thick. Usually, the performance improves if it is translucent enough so that it radiates equally in both directions regardless of which section of the ellipsoidal reflector supplies the light that impinges upon it.

In one embodiment, the light radiating member includes, for this purpose, a translucent light diffusing surface having a passive light radiating means such as particles in a layer sufficiently thin to be translucent or having light scattering deformations in the surface. Herein, a passive light radiating means does not emit light by the changes in the state of excitation of its atoms or molecules such as happens in incandescent or fluorescent radiators but only re-radiates light.

The light diffusing surface scatters light incident upon it in a random manner, causing the light to be radiated in accordance with Lambert's cosine law, with the intensity being proportional to the cosine of the angle with respect to a normal to the light diffusing surface regardless of its location of origin in the lamp 30. Accordingly, the ratio of the intensities of the light in the beams is constant because the beams are all at a constant angle to the emitting surface. Moreover, because the light radiating member is translucent and does not absorb much light, light from each one of the sectors 36 and 38 is re-radiated from both sides of the light radiating member 32 and contributes to each of the beams of light, thereby further tending to equalize the beams of light.

In another embodiment, the light radiating member includes, for this purpose, fluorescent particles in a layer sufficiently thin to be translucent or a transparent sheet of fluorescent material mounted to the transparent or translucent base of the light radiating member 32. The fluorescent particles or sheet emit light in all directions so that each point contributes proportionately each of the beams of light. The fluorescent particles, when used, also create a diffusing surface, causing diffused light of the frequency emitted by the lamp 30 as well as light emitted by fluorescence of the particles to be directed into each of the beams of light. The light absorbed by the fluorescent particles reduces the constant-ratio effect some, but the performance is still adequate for most purposes.

The frequencies of light to be passed through the light absorbance cells 14 and 16 and applied to the photocell within the light measuring cells 18 and 20 are selected by including filters in the path of the beams of light to selectively absorb those frequencies of light that are not to be passed to the photocells. Since the filters are easily changed, the presence of two different ranges of frequencies of light, one from fluorescence of the particles and the other from diffusion of light, each of which is useful in a different application of the dual-beam optical system, enables the dual-beam optical system to be easily adapted to different applications.

In the preferred embodiment, the light absorbance cells 14 and 16 are flow cells, at least one of which is adapted to receive the solvent and solute from a chromatographic column. The flow cells include windows aligned with the two oppositely positioned light-beam holes in the ellipsoidal reflector 34, the light radiating member 32, and the light measuring cells 18 and 20 so that two oppositely-directed beams of light are radiated from the light radiating member 32 through the flow cells 14 and 16 to energize the photoconductors within the first and second light measuring cells 18 and 20. The light measuring cells 18 and 20 include appropriate filters positioned between their photocells and the light entrance aperture to pass selected frequencies of light. The dual-beam optical system 12, the light absorbance cells 14 and 16, and the light measuring cells 18 and 20 are described in greater detail in U.S. Pat. application No. 259,868 to Robert W. Allington filed June 5, 1972, for Dual Beam Optical System.

Of course, the light intensity monitor 21 may be used to control the light intensity from apparatus not described in detail in the aforementioned patent application, but it is particularly well adapted and has special advantages when used in combination with that optical system. Moreover, certain engineering changes may be necessary to adapt other types of apparatus for use in a combination including the light-intensity monitor 21. In general, the light intensity monitor 21 has particular utility when used with an optical system having a primary source of light which emits light in different directions or from different locations, with the light in one direction or from one location varying in intensity with respect to the intensity of light emitted in another direction or from another location at certain times.

The light intensity monitor 21 includes the photodetector 40, a feedback control circuit 42 and a light intensity control circuit 44.

To control the light intensity control circuit 44, the feedback control circuit 42 has its input electrically connected to the photodetector 40, which is mounted to the base 22 of the lamp 30 in a position where it receives light from a large solid angle emitted by the lamp 30, and has its output electrically connected to the light intensity control circuit 44, which is electrically connected to the lamp 30 to control the intensity thereof in response to signals from the feedback control circuit 42.

Figure 3:
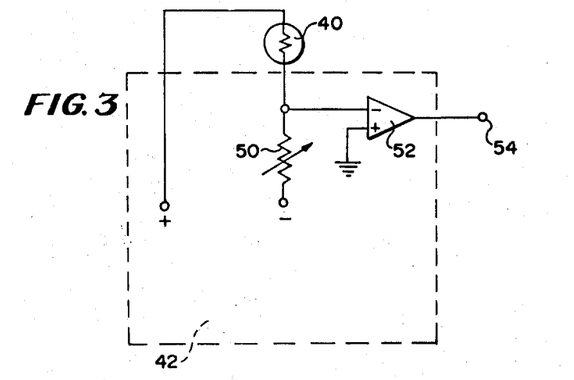
FIG. 3 is a schematic circuit diagram of the feedback circuit included in an embodiment of the invention.

In FIG. 3 there is shown a schematic circuit diagram of the photodetector 40 and the feedback circuit 42 of the light-intensity monitor 21, with the feedback circuit 42 including a potentiometer 50 and an amplifier 52.

To provide signals to the input of the amplifier 52, which signals indicate changes in the intensity of the light radiated from the light radiating member 32 (FIG. 1), the inverting input of the amplifier 52 is electrically connected to both the photodetector 40 and the potentiometer 50, with the photodetector 40, the inverting input terminal to the amplifier 52, and the potentiometer 50 being electrically connected in series in the order named between a source of positive potential and a source of negative potential.

Since the photoconductor 40 decreases its resistance as the light intensity incident upon it increases, a positive-going signal is applied to the inverting input terminal of the amplifier 52 as the intensity of light radiated from the light-radiating member 32 increases, and a negative-going potential is applied to the inverting terminal of the amplifier 52 as the intensity of light radiated from the light-radiating member 32 decreases. An output terminal 54 is electrically connected to the output of the amplifier 52 to provide a negative-going signal when the intensity of light radiated from the light radiating member 32 to the photoconductor 40 increases and to provide a positive going signal when the light intensity of the light radiated by the light-radiating member 32 to the photoconductor 40 decreases in intensity. The potentiometer 50 is adjusted to maintain signals from the photoconductor 40 within the dynamic range of the amplifier 52 and to control the sensitivity of the light-intensity monitor 21.

Figure 4:
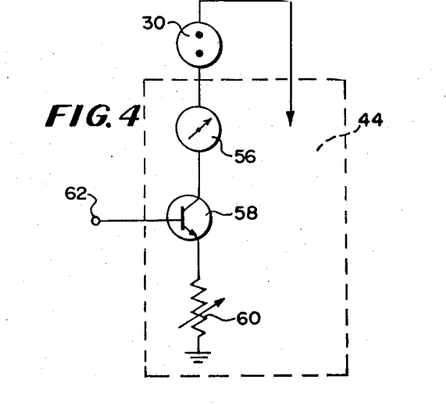
FIG. 4 is a schematic circuit diagram of a light intensity control circuit useful in an embodiment of the invention.

In FIG. 4, there is shown a schematic circuit diagram of the lamp 30 and the light intensity control circuit 44 electrically connected together, with the light-intensity control circuit 44 including a lamp current meter 56, an npn transistor 58, a potentiometer 60, and an input terminal 62. The lamp 30, the lamp-current meter 56, the npn transistor 58 and the potentiometer 60 are electrically connected in series in the order named between a source of positive potential and ground, with the base of the npn transistor being electrically connected to the input terminal 62, its collector being electrically connected to the meter 56, and its emitter being electrically connected to the potentiometer 60. To receive signals from the feedback circuit 42, the input terminal 62 of the light-intensity control circuit 44 is connected to the output terminal 54 (FIG. 3) of the feedback circuit 42.

DETAILED DESCRIPTION OF OPERATION

Before operating the dual-beam optical system 10, filters are inserted into the first and second light measuring cells 18 and 20 (FIG. 1), the intensity of the lamp 30 is adjusted by adjusting the potentiometers 60 and 50. The current flowing through the lamp 30 is measured by the meter 56 for convenience in making adjustments.

Generally the filters are selected in accordance with the particular use of the dual-beam optical system. For example, to detect a solute that absorbs light having a wave length of 254 nanometers, filters are inserted into the light measuring cells 18 and 20 to block light having wavelengths other than 254 nanometers, 254 nanometers being one wavelength of light emitted by low pressure mercury lamps. On the other hand, to detect a solute that absorbs light having a wavelength of between 270 and 290 nanometers, filters are inserted to block other wavelengths of light, light having a wavelength of between 270 and 290 nanometers being emitted by certain flourescent phosphors that may be incorporated in light-radiating member 32.

In the operation of the dual-beam optical system 10 to compare a solvent containing a solute with a pure solvent, a solvent containing a solute is pumped through the first light absorbance cell 14 and pure solvent is pumped through the second light absorbance cell 16. While the solvent and solute are flowing through the absorbance cells, the first beam of light is transmitted through the first light absorbance cell to the first light measuring cell 18 and the second beam of the light is transmitted through the second light absorbance cell to the second light measuring cell 20, with the first and second beams of light having proportional light intensities.

The first light measuring cell 18 and the second light measuring cell 20 derive signals representing the intensity of the light in the first and second beams of light and these signals are compared in circuitry (not shown) to obtain information about the solute flowing through the first light absorbance cell. While the first and second beams of light are being radiated through the first and second light absorbance cells, the light-intensity monitor 21 detects changes in the intensity of the light being radiated from the primary light source and corrects for such changes to maintain the intensity of the light constant. Of course, in a optical unit utilizing only one beam of light or in an optical system in which the two beams of light are each used to locate solute in a different light absorbance cell, the light-intensity monitor 21 operates in the same manner.

To generate the first and second beams of light, the lamp 30 radiates light, which in the preferred embodiment is ultraviolet light having a relatively high intensity at 254 nanometers onto the light radiating member 32. Since the bright spot of the lamp 30 is in one focus and the light radiating member 32 is in the other focus of the ellipsoidal reflector 34, light from a solid angle that is a major portion of a sphere is radiated from the lamp 30 to the light radiating member 32. The light emitted in one direction or from one location within the lamp 30 may vary in intensity with respect to the light emitted in a different direction or from a different location in the lamp 30. This occurs in low pressure mercury vapor lamps because the vapor moves about in the lamp by convection, absorbing more light flowing through one path with the lamp than through another path.

To maintain the intensity of the light in the first, second and third light beams in a constant proportion to each other, the light-radiating member 32 radiates light with proportional intensities in different directions with the proportion of light radiated in each direction depending on the direction even though the light from the lamp 30 may have an intensity in one direction that varies with respect to the intensity in another direction.

In one embodiment, the light radiating member 32 is a translucent diffusing surface that diffuses the light radiated to it and re-radiates it through the three light-beam holes in the ellipsoidal reflector 34. The light is radiated in accordance with Lambert's cosine law with the light impinging upon each spot, causing proportional radiation into each of the beams of light.

In another embodiment, the light radiating member 32 includes a thin translucent layer of flourescent particles which diffuses light and flouresces, with the diffused light making proportional contributions to each of the beams of light of a first frequency and with the flourescent light making proportional contributions to each of the beams of light of another frequency because the intensity of the radiation of diffused light and flourescent light is independent of the direction of the light causing the radiation.

In still another embodiment, the light radiating member is a translucent or transparent flourescent material which fluoresces light into each of the beams of light with proportional intensity.

After the first and second beams of light pass through the first and second light absorbance cells 14 and 16, they impinge upon the first and second light measuring cells 18 and 20, where they pass through filters that select a single spectral region to transmit to the photocells which develop signals related to the amount of light absorbed by the solute and solvent. The filters are selected in accordance with the particular application of the dual-beam optical system as explained above.

To maintain the intensity of light in the light beams constant, the photodetector 40 receives light from the lamp 30 which light is proportional in intensity to a function of first and second beams of light. The photodetector 40 generates an electrical signal in response to the light, which electrical signal indicates changes in the intensity of the light received by and radiated from the light radiating member 32 and applies this signal to the feedback control circuit 42. In response to the signal from the photodetector 40, the feedback control circuit 42 causes the light intensity control circuit 44 to correct for any changes in the intensity of the light radiated from the lamp 30 to maintain the light intensity in the first and second light beams constant.

To receive signals indicating changes in the intensity of light from the photodetector 40 and to control the light intensity control circuit 44, changes in the resistance of the light intensity detector 40 cause changes in the input signal applied to the amplifier 52. The amplifier 52 inverts the changes and applies them to the output terminal 54 which is connected to the input terminal 62 of the light intensity control circuit 44.

When the intensity of the light on the light radiating member 32 from the light source 30 increases, the resistance of the photodetector 40 decreases, causing the input potential to the amplifier 52 to change in a positive direction, resulting in a negative-going signal on terminal 54. When the intensity of the light on radiating member 32 decreases, the resistence of the photodetector increases, causing the input potential to the amplifier 52 to change in a negative direction, resulting in a positive-going signal at the output terminal 54.

To control the intensity of the light emitted by the lamp 30, a positive-going signal on the input terminal 62 of the light intensity control circuit 44 increases the conductivity of transistor 58, causing more current to flow through the lamp 30, and thereby increasing the intensity of light emitted by the lamp 30. A negative signal on input terminal 62 decreases the conductivity of the transistor 58, decreasing the current through the lamp 30 and thereby decreasing the intensity of the light emitted by the lamp 30. Accordingly, a decrease in the intensity of the light emitted by the lamp 30 is resisted by a tendency to increase the intensity of the light emitted by the lamp 30 and an increase in the intensity of the light emitted by the lamp 30 is resisted by a tendency to decrease the intensity of the light emitted by the lamp 30.

From the above description it can be understood that the dual beam optical system 10 has the advantage of providing relatively high precision in maintaining the intensity of the light in the first and second light beams constant and of being economical. The control of the intensity of the beams of light is precise because: (1) the light monitoring system is controlled by light emitted from the light source 30 and the prolate-spheroid-shaped reflector enables a large percentage of this light to be utilized; (2) the photodetector receives light of relatively high intensity from the lamp so that it responds to changes in intensity faster than would be the case if the photodetector received lower intensity light through a light beam hole in the reflector. The light monitor is economical because the photodetector is easily mounted to the base 22 of the primary light source 30 and because the feedback circuit is simplified by the increased stability of the light monitor over light monitors that monitor light reflected from the radiating member.

Although a preferred embodiment of the invention has been described with some particularity, many modifications and variations are possible in the preferred embodiment without deviating from the invention. Accordingly, it is to be understood that, within the scope of the appended claims, the invention may be practiced otherwise than specifically described.

What is claimed is:

1. Apparatus for applying light from a primary light source to an object with a controlled intensity comprising:

a light-radiating member;

focusing means for focusing light emitted through a relatively large solid angle from said light source onto a spot on said light-radiating member, whereby a substantial amount of light is radiated by said light-radiating member;

said primary light source including means for emitting light in a plurality of directions with an intensity that fluctuates in one directionn with respect to the intensity in another direction;

electrical power means for controlling the intensity of light from said light source;

detector means for detecting the intensity of the light emitted from said light source; and feedback control means for causing said electrical power means to increase the intensity of light from said light source when said detector means detects a decrease in the intensity of said light and for causing said electrical power means to decrease the intensity of light from said light source when said detector means detects an increase in the intensity of said light;

said detector means being positioned at a location where it receives substantial amounts of light flux from said primary light source;

said light-radiating member being sufficiently translucent to radiate light focused upon it from any direction equally in two opposite directions.

2. Apparatus according to claim 1 in which:

said light-radiating member is a passive light radiating means; and said passive light-radiating means includes means for substantially diffusing light.

3. Apparatus according to claim 2 in which said light-radiating member includes a light-radiating means for radiating light along at least a first and a second path from said radiating member in response to said light from said source of light with a substantially constant ratio of the intensity of the light in said first path to the intensity of light in said second path, which ratio is substantially independent of fluctuations in the light from said light source.

4. Apparatus according to claim 3 in which:
said focusing means includes a prolate-spheroid-shaped reflector having first and second foci;
said light-radiating member being located in said first focus of said prolate-spheroid-shaped reflector;
said light source including means for emitting light from said second focus of said prolate-spheroid-shaped reflector;
said prolate-spheroid-shaped reflector including a first section having internal walls defining a first hole and a second section having internal walls defining a second hole;
said first hole, first path and light radiating means being aligned; and
said second hole, second path and light radiating means being aligned.

5. Apparatus according to claim 1 in which:
said focusing means includes a prolate-spheroid-shaped reflector having first and second foci;
said light-radiating member being located in said first focus of said prolate-spheroid-shaped reflector to radiate light along at least a first and second path from said radiating member;
said light source including means for emitting light from said second focus of said prolate-spheroid-shaped reflector;
said prolate-spheroid-shaped reflector including a first section having internal walls defining a first hole and a second section having internal walls defining a second hole;
said first hole, first path and light-radiating member being aligned; and
said second hole, second path and light-radiating member being aligned.

6. Apparatus according to claim 1 in which:
said light-radiating member is a clear fluorescent means for emitting light at a first frequency when impinged upon by light having a second frequency; and
said light source includes means for emitting light of said second frequency.

7. Apparatus according to claim 6 in which said fluorescent means comprises means for emitting light having a wavelength substantially in the range of 270 to 290 nanometers and said light source is an ultraviolet lamp.

8. Apparatus according to claim 7 in which said radiating member includes a light-radiating means for radiating light along at least a first and a second path from said radiating member in response to said light from said source of light with a substantially constant ratio of the intensity of the light in said first path to the intensity of the light in said second path, which ratio is substantially independent of fluctuations in the light from said light source.

9. Apparatus according to claim 8 in which:
said focusing means includes a prolate-spheroid-shaped reflector having first and second foci:
said light-radiating member being located in said first focus of said prolate-spheroid-shaped reflector;
said light source including means for emitting light from said second focus of said prolate-spheroid-shaped reflector;
said prolate-spheroid-shaped reflector including a first section having internal walls defining a first hole and a second section having internal walls defining a second hole;
said first hole, first path and light-radiating member being aligned; and
said second hole, second path and radiating means being aligned.

10. Apparatus according to claim 1 in which said light-radiating member includes means for substantially re-radiating light in directions spacially independent from the directions of the light impinging upon it.

11. Apparatus according to claim 10 in which said means for re-radiating light comprises a plurality of particles.

12. Apparatus according to claim 11 in which:
said plurality of particles comprise fluorescent means for emitting light at a first frequency when impinged upon by light having a second frequency; and
said light source includes means for emitting light of said second frequency, whereby fluorescent light of said first frequency is directed toward said object.

13. Apparatus according to claim 11 in which said plurality of particles comprise means for passively re-radiating diffused light and for radiating fluorescent light toward said object.

14. Apparatus according to claim 13 in which said light-radiating member includes a light-radiating means for radiating light along at least a first and a second path from said light-radiating member in response to said light from said source of light with a substantially constant ratio of the intensity of the light in said first path to the intensity of the light in said second path, which ratio is substantially independent of fluctuations in the light from said light source.

15. Apparatus according to claim 14 in which:
said focusing means includes an prolate-spheroid-shaped reflector having first and second foci;
said light-radiating member is located in said first focus of said prolate-spheroid-shaped reflector;
said light source includes means for emitting light from said second focus of said prolate-spheroid-shaped reflector;
said prolate-spheroid-shaped reflector includes a first section having internal walls defining a first hole and a second section having internal walls defining a second hole;
said first hole, first path and light-radiating member are aligned; and
said second hole, second path and radiating member are aligned.

16. Apparatus according to claim 15 in which said particles comprise means for radiating light having a wavelength substantially in the range of 270 to 290 nanometers, and said light source is an ultraviolet lamp.

17. Apparatus according to claim 1 in which:
said light source is a mercury vapor lamp; and
said apparatus includes temperature control means for maintaining the temperature of the mercury vapor lamp within a predetermined range.

18. Apparatus according to claim 17 in which said temperature control means is a heat sink positioned adjacent to said mercury vapor lamp.

19. Apparatus according to claim 1 further including at least first and second photocells, means for radiating a light from said light-radiating member onto said first photocell through one light path and on said second photocell through a second light path.

20. Apparatus according to claim 2 further including at least first and second photocells and means for radiating light from said light-radiating member onto said first photocell along a first path and onto said second photocell along a second path.

21. Apparatus according to claim 6 further including at least first and second photocells, and means for radiating light from said light-radiating member onto said first photocell through a first light path and onto said second photocell through a second light path.

22. Apparatus according to claim 12 further including at least first and second photocells and means for radiating light from said light-radiating member onto said first photocell through a first light path and onto said second photocell through a second light path.

23. Apparatus according to claim 13 further including at least first and second photocells and means for radiating light from said light-radiating member onto said first photocell through a first light path and onto said second photocell through a second light path.

* * * * *

UNITED STATES PATENT OFFICE
CERTIFICATE OF CORRECTION

Patent No. 3,859,539          Dated January 7, 1975

Inventor(s) Robert William Allington

It is certified that error appears in the above-identified patent and that said Letters Patent are hereby corrected as shown below:

Column 3, line 12, "source," is changed to --source.--.

Column 3, line 44, "cenral" is changed to --central--.

Column 7, line 5, after "light" insert "in the light".

Column 9, line 30, "in" is changed to --In--.

Column 12, line 40, "directionn" is changed to --direction--.

Signed and Sealed this twenty-seventh Day of January 1976

[SEAL]

Attest:

RUTH C. MASON
*Attesting Officer*

C. MARSHALL DANN
*Commissioner of Patents and Trademarks*